United States Patent [19]

Bischoff

[11] 4,391,849
[45] Jul. 5, 1983

[54] METAL OXIDE PATTERNS WITH PLANAR SURFACE

[75] Inventor: Peter G. Bischoff, Cupertino, Calif.

[73] Assignee: Memorex Corporation, Santa Clara, Calif.

[21] Appl. No.: 367,366

[22] Filed: Apr. 12, 1982

[51] Int. Cl.³ .......................................... H01L 21/308
[52] U.S. Cl. ..................... 427/129; 156/643;
156/652; 156/653; 156/656; 156/657;
156/659.1; 156/664; 156/665; 204/15; 204/32
R; 204/38 R; 204/38 A; 204/42; 204/56 R;
204/192 M; 427/130; 427/250; 427/259;
427/336
[58] Field of Search ............... 156/643, 657, 652, 664,
156/653, 665, 656, 659.1; 204/15, 32 R, 38 R,
38 A, 42, 56 R, 192 M; 427/250, 129, 259, 130,
336, 131

[56] References Cited

U.S. PATENT DOCUMENTS

| | | | |
|---|---|---|---|
| 3,708,403 | 1/1973 | Koger et al. | 204/15 |
| 3,723,665 | 3/1973 | Lazzari et al. | 340/174.1 F |
| 3,741,880 | 6/1973 | Shiba et al. | 204/15 |
| 3,939,047 | 2/1976 | Tsunemitsu et al. | 204/15 |
| 3,969,746 | 7/1976 | Kendall et al. | 357/30 |
| 4,045,302 | 8/1977 | Gibbs et al. | 204/15 |
| 4,052,749 | 10/1977 | Nomura et al. | 360/123 |
| 4,069,094 | 1/1978 | Shaw et al. | 156/612 |
| 4,076,575 | 2/1976 | Chang | 156/656 |
| 4,076,860 | 2/1976 | Kuroda | 427/91 |
| 4,081,823 | 3/1978 | Cook | 357/47 |
| 4,161,430 | 7/1979 | Sogo | 204/15 |
| 4,174,219 | 11/1979 | Andres et al. | 427/250 |
| 4,199,384 | 4/1980 | Hsu | 156/653 |
| 4,206,541 | 6/1980 | Marciniec | 156/656 |
| 4,251,319 | 2/1981 | Bonnie et al. | 156/656 |
| 4,317,700 | 3/1982 | Tanaka et al. | 156/652 |
| 4,334,950 | 6/1982 | Roman | 156/643 |

*Primary Examiner*—Jerome W. Massie
*Attorney, Agent, or Firm*—David W. Heid; Nathan Cass; John J. McCormack

[57] ABSTRACT

The subject invention relates to the fabrication of metal oxide patterns on a substrate adapted for use with thin film magnetic heads. The metal oxide pattern has a precisely defined geometry including nearly vertical side walls, for minimizing read/write errors. In addition, a filler material formed from a non-magnetic, non-metallic compound is provided on the substrate in a pattern complimentary to the metal oxide pattern. In accordance with the subject invention, the top surface of the metal oxide pattern and the filler material are co-planar. By this arrangement, subsequent layers may be uniformly deposited without discontinuities. The subject method includes a plurality of distinct masking and etching steps in order to achieve the desired result.

7 Claims, 11 Drawing Figures

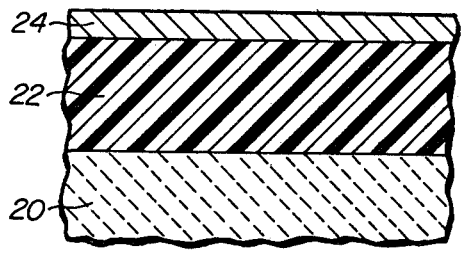
FIG._1.
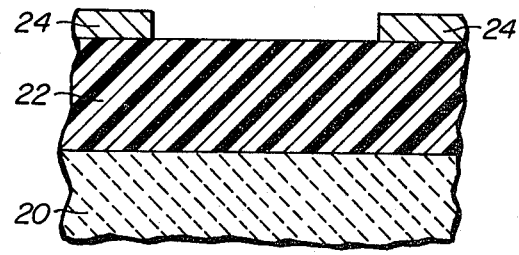
FIG._2.
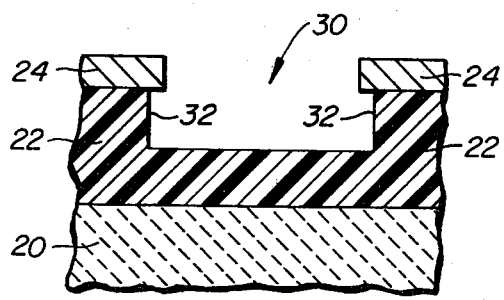
FIG._3.
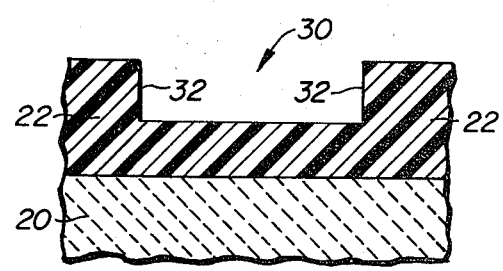
FIG._4.
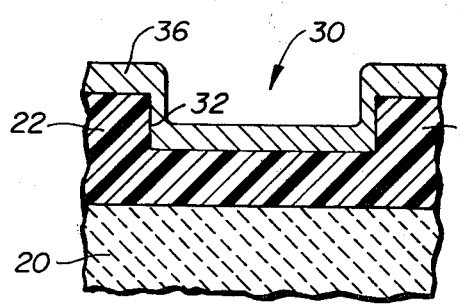
FIG._5.
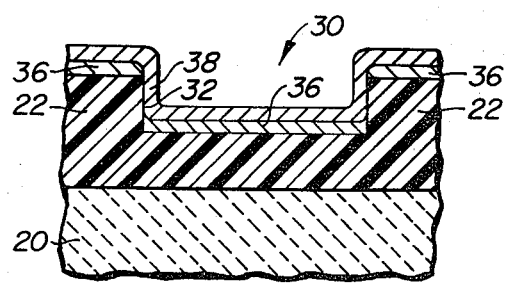
FIG._6.

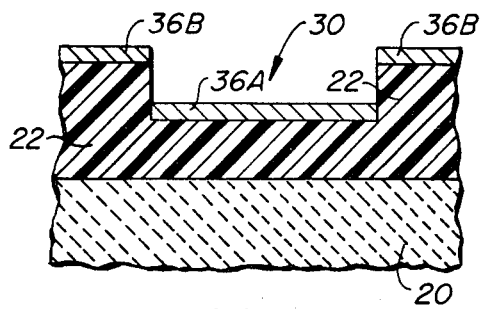
FIG._7.
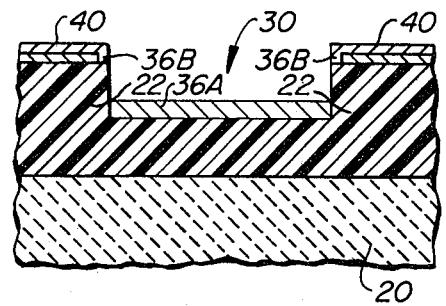
FIG._8.
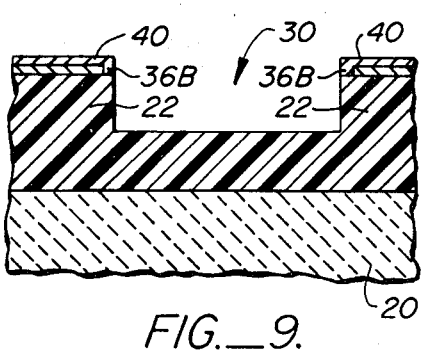
FIG._9.
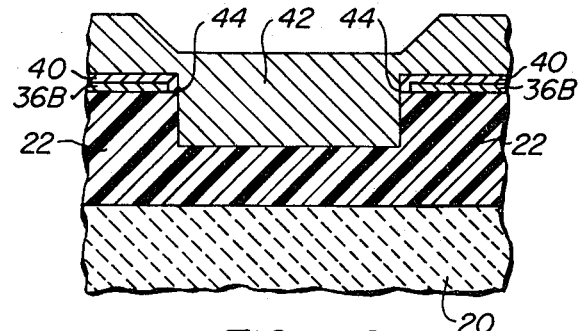
FIG._10.
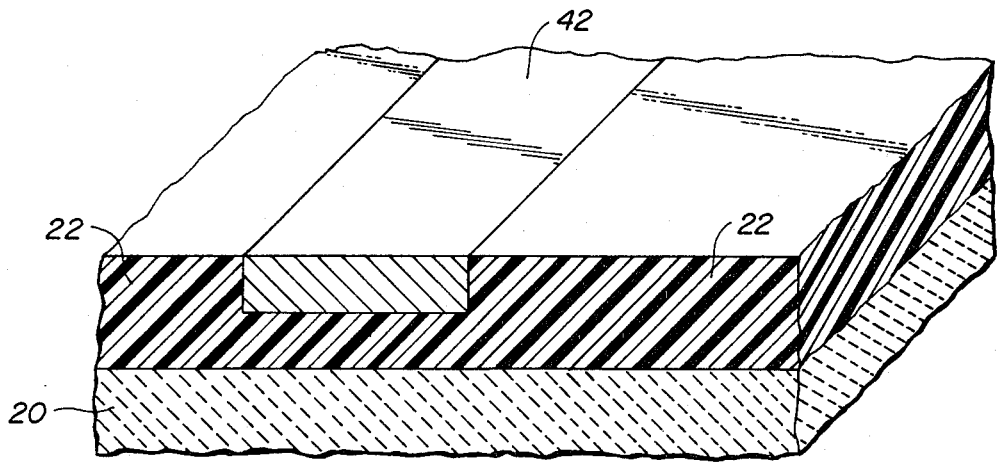
FIG._11.

METAL OXIDE PATTERNS WITH PLANAR SURFACE

BACKGROUND OF THE INVENTION

The subject invention relates to the fabrication of metal oxide patterns on a substrate adapted for use with thin film inductive transducers. The transducers, commonly referred to as thin film magnetic heads, are useful for recording and reading magnetic transitions on a moving magnetic recording medium.

Thin film recording heads are generally manufactured by an etching process wherein an electromagnet is formed on the surface of a substrate. More particularly, a magnetic material is deposited on a suitable substrate and is etched to the desired configuration. Thereafter, conductive layers are deposited on the magnetic material and etched to define the windings of the electromagnet. At least one additional layer of magnetic material is deposited in a manner such that the rear ends of the magnetic materials are connected while the front ends thereof are separated to define a recording gap. An electric current may be passed through the windings of the conductor for recording.

The gap or pole tip region of the head is intended to fly in close proximity to the magnetic recording medium. In order to maximize the reading and writing ability of the thin film head, it is of critical importance to define the geometry of the pole tip region to within extremely precise tolerances. It has been found that read/write errors can be minimized when the pole tip regions of the electromagnet are formed with straight side walls.

In contrast, the side walls of the remaining portions of the magnetic head, which are spaced from the pole tip region, need not be formed with a precise vertical geometry. In fact, when the lower pole of the head is provided with vertical side walls along its entire length, problems arise relating to the deposition of the conductive layer used to define the windings of the electromagnet. As can be appreciated, it is relatively difficult to control the thickness of a layer which is being deposited on a surface having sharp, angular features. Thus, windings deposited on the magnetic material will frequently have undersirable discontinuities particularly in regions having sharp corners.

Accordingly, in the prior art, various methods have been developed to reduce the occurance of discontinuities in the windings. One proposed solution is to bevel the side walls of the magnetic material to obtain a smooth, sloping surface thereby facilitating the deposition of the conductive layer over the magnetic material. However, it is important that only the rear portions of the magnetic material be beveled since the pole tip regions of the head must be provided with vertical side walls in order to minimize read/write errors.

Therefore, in the prior art, a method was developed wherein the degree of beveling of the side walls could be controlled such that the pole tip regions were provided with vertical side walls, while the rear portions of the side walls were sloped to facilitate the deposition of the conductive windings. The later method is disclosed in U.S. patent application Ser. No. 311,968 filed Oct. 16, 1981, now U.S. Pat. No. 4,351,698 assigned to the assignee as the subject invention. The latter method includes a new and improved multiple masking technique to achieve the unique and desired configuration of the magnetic material.

Various other solutions have been proposed to solve the problem of discontinuities in the conductive layer. One such solution, called "planarization", includes filling in the areas, adjacent the magnetic material, with a non-magnetic, non-metallic compound in a manner such that the top surface of the resulting structure is defined by a smooth plane. In this solution, the magnetic material is formed with vertical side walls throughout its construction. Further, since the upper surface of the magnetic material is co-planar with the non-magnetic filler material, additional layers may be accurately deposited on the planar surface of the structure whereby discontinuities may be substantially diminished.

Unfortunately, in the prior art, no suitable method has been devised to produce the proposed planarized structure. The most obvious method would include a mechanical lapping operation. More particularly, in the latter method, the metallic material is initially deposited on a substrate. Thereafter, a layer of non-metallic, non-magnetic filler material is deposited over the magnetic material. Using a mechanical grinder or lapping apparatus, the surface of the layers could be abraded until the desired planar configuration is achieved. However, due to the fragile nature and small size of thin film magnetic recording heads, this method is impractical because it is both cumbersome and expensive.

Another proposed planarization method includes a thermal oxidation step, for equalizing the depth of the layers. Thermal oxidation is a diffusion process which typically takes place at elevated temperatures in the range of 950 to 1200 degrees centigrade. This method is not adaptable to present manufacturing requirements since the materials utilized in forming the thin film magnetic heads suffer severe degredation, including recrystalization and strain, when subjected to temperatures over 400 degrees centigrade. Another possible method includes the use of liquified glasses, which can be flowably formed on the substrate. However, as with thermal oxidation, most usable glasses melt at temperatures greater than 400 degrees centigrade. The glasses which are found to melt at lower temperatures are not compatible with thin film processing because their thermal expansion and softening points are not satisfactory. Accordingly, it would be desirable to provide a new and improved method for planarizing the surface of the magnetic material of a thin film recording head such that successive layers may be readily deposited without discontinuities.

SUMMARY OF THE INVENTION

Accordingly, it is an object of the subject invention to provide a new and improved method for planarizing the upper surface of a structure which includes a magnetic material forming a portion of a thin film magnetic recording head.

It is another object of the subject invention to provide a new and improved method for fabricating a thin film magnetic recording head wherein the pole tips thereof can be accurately manufactured with substantially vertical side walls to exact tolerances.

It is a further object of the subject invention to provide a new and improved method, for fabricating thin film magnetic recording heads, which facilitates the depositing of additional layers and diminishes the likelihood of the occurance of discontinuities.

In accordance with these and many other objects the subject invention relates to a method of fabricating the metallic magnetic pattern on a substrate for use with thin film recording heads. The metallic pattern and non-magnetic, non-conductive filler material are formed on the substrate in complimentary patterns such that the top surfaces of both materials are co-planar. By this arrangement, the deposition of additional layers is facilitated.

In accordance with the subject method, a layer of a non-conductive, non-magnetic material, formed from a compound such as silicon dioxide, is applied to the substrate. A relatively thinner second layer is deposited over the non-magnetic layer. The second layer is formed from a metal such as aluminum or chromium which is insoluable in a silicon dioxide etchant. A photoresist layer is placed on the top of the metal layer in a negative pattern with respect to the desired metallic magnetic pattern. By this arrangement, a metal etchant can be used to remove the aluminum or other metal layer in a pattern corresponding to the metallic pattern.

In accordance with the subject invention, utilizing the etched aluminum layer as a mask, the silicon dioxide layer is plasma etched to define a cavity having a configuration corresponding to the desired metallic pattern. Due to the high speed and directional nature of plasma etching, a cavity having relatively vertical side walls is produced. After the plasma etching step, any remaining portions of the aluminum layer are removed. If $Al_2O_3$ is used Cr is the desired masking material and the $Al_2O_3$ can be etched in a mixture of $HNO_3$, HF and $H_2O$. The $Al_2O_3$ can be deposited with RF sputtering or reactive oxide sputtering and the deposition parameters are choosen to enhance the etch rate and form nearly vertical side walls.

Using electron beam evaporation, another layer of aluminum or other suitable metal is deposited over the structure after the first aluminum layer has been stripped. As discussed above, a layer, deposited over a structure having a sharp, angular configuration, tends to be uneven. Thus, the thickness of the newly deposited aluminum layer, along the side walls of the cavity, is less than the thickness of the layer along the horizontal portions of the structure. In the prior art, the resulting non-uniformity was considered a serious shortcoming since it often produced discontinuities in the conductive windings. By contrast, in the subject invention, this non-uniform effect is utilized advantageously. More particularly, the deposited aluminum layer is soft anodized to a depth sufficient to affect all of the aluminum formed on the side walls of the cavity. To obtain this result, the base of the cavity is electrically connected in a circuit and the anodizong step is continued until the aluminum on the side walls is converted and the circuit is broken. The soft anodized portions of the aluminum are then removed by an etchant which does not attack either the unchanged aluminum or the dielectric. By this arrangement, the aluminum formed on the bottom of the cavity is isolated from the aluminum remaining on the surface of the dialectric.

In the next step of the subject method, the aluminum located on top of the $SiO_2$ layer is hard anodized. This is accomplished electrochemically by linking the aluminum on the top portions in a circuit. Since the aluminum in the bottom of the cavity is electrically isolated from the aluminum on the top surface of the $SiO_2$, only latter will be hard anodized. Using the hard anodized aluminum as a mask, the remaining aluminum in the cavity can be etched using a phosphoric acid based solution.

Thereafter, using well known sputtering techniques, a layer of the magnetic metallic material is applied to the structure. Preferably, a Ni-Fe permalloy material is used. The permalloy is applied such that the cavity is filled while a relatively thin layer is formed adjacent the upper edges of the cavity. The upper surface of the permalloy is then removed to a depth sufficient to expose the aluminum layer adjacent the top edges of the cavity. The removal of the permalloy can be accomplished through well known sputter etching techniques.

After the aluminum has been exposed, the structure can be emersed in a bath of sodium hydroxide which functions to dissolve the aluminum. The removal of the intermediate aluminum layer functions to strip the excess permalloy from the structure resulting in a configuration wherein the cavity is filled, while the top surface of the permalloy is co-planar with the $SiO_2$ layer. Accordingly, subsequent layers, including the conductive windings may be readily applied to the planarized structure. Further, the permalloy is formed with vertical, or nearly vertical straight side walls for maximizing read/write operations.

Further objects in advantage of the subject invention will become apparent from the following detailed description taken in conjunction with the drawings in which;

BRIEF DESCRIPTION OF THE DRAWINGS

FIG. 1 is side elevational view illustrating a substrate having layers formed thereon in accordance with the initial steps of the subject method.

FIGS. 2-10 are side elevational views, similar to FIG. 1, illustrating subsequent steps of the new and improved method of the subject invention.

FIG. 11 is a partial perspective view of the structure including the bottom pole of a thin film recording head, made in accordance with the method of the subject invention.

DETAILED DESCRIPTION OF THE PREFERRED EMBODIMENT

The subject invention relates to a method for fabricating a metallic magnetic pattern on a substrate. The magnetic metallic pattern, formed from Ni-Fe permalloy material, defines the bottom pole of a thin film transducer. FIGS. 1-10 illustrate the steps of the subject method.

Thin film magnetic heads are formed on a non-magnetic substrate 20. Typically, a plurality of magnetic recording heads will be placed in a spaced array, along the length of the substrate 20. In accordance with the subject invention, a first layer of filler material 22 is applied to the substrate to a depth somewhat thicker than the desired thickness of the eventual permalloy pattern, which generally ranges from approximately 3-4 microns. The filler material 22 is formed from a non-conductive, non-metallic compound such as silicon dioxide. Other possible compounds include $Si_3N_4$ and $Al_2O_3$.

After the formation of the first layer 22, a relatively thinner, second metal layer 24 is applied. The particular metal of the second layer 24 is selected to have good adhesion to the first layer material and to be insoluable in an etchant which will attack the first material. Preferably, the metal 24 of the second layer is aluminum if $SiO_2$ is the first layer and Cr if $Al_2O_3$ is the first layer and has a thickness on the order of approximately 0.1 to 1 microns. The deposition of the two continuous layers 22, 24, upon the substrate 20, produces a structure as illustrated in FIG. 1.

In the next step of the subject method, a layer (not shown) of photoresist material is applied to the upper surface of the metal layer 24. The photoresist must be etched to define a negative pattern, complimentary to the desired pattern of the permalloy. Typically, this is accomplished using a masking technique wherein the photoresist is selectively exposed to curing radiation. The non-cured portion may then be removed to define the negative pattern. A suitable etchant for metal is then applied to the surface of the structure for removing the portions of the second aluminum layer 24 not masked by the remaining photoresist to achieve the configuration illustrated in FIG. 2.

In accordance with the subject method, the layer 22 is then etched to define a cavity 30, having relatively vertical side walls 32 as illustrated in FIG. 3. As described more fully below, side walls 32 of cavity 30 serve to define the desired side walls of the permalloy material. In order to produce the substantially vertical side walls 32, the silicon dioxide layer 22 is plasma etched, using the upper aluminum layer 24 as a mask. Plasma etching is a relatively high speed, directional operation which can provide the accuracy necessary for this removal step. Once the desired cavity 30 is formed, the remaining layer 24 is removed to achieve the structure illustrated in FIG. 4. The photoresist layer may be removed either prior to, or after the plasma etching step. When layer 24 is aluminum, it can be most readily removed by chemical etching.

In the next step of the subject method, another metal layer 36 is formed on the structure by, for example, electron beam evaporation. The metal is preferably aluminum. As illustrated in FIG. 5, due to the sharp angular configuration of the upper surface of the structure, layer 36 is not applied uniformly. More particularly, the thickness of the metal layer 36 is greater on the horizontal surfaces than along the vertical side walls 32 of the cavity 30. As discussed above, in the prior art, a non-uniform layer, which is commonly formed over angular structures, was considered a shortcoming, since it often resulted in undesirable discontinuities in the layer. However, as will be discussed below, this effect is used advantageously in the subject invention. Preferably, the thickness of the metal layer 36, along the horizontal surfaces of the structure, is about twice as great as the thickness along the side walls 32 thereof.

The aluminum layer 36 is then subjected to a soft anodizing step to form a thin porous alumina (aluminum oxide) film 38 on its surface. The method and apparatus used for anodizing are well known in the art and need not be described in detail. Briefly, the structure is submersed in a electrolytic anodizing solution and a potential is supplied between the aluminum layer and the solution. The anodizing step is continued to a depth sufficient to convert all of the aluminum on the side walls 32 of the cavity to aluminum oxide. This result may be readily achieved because the electrical current will continue to flow through the conductive aluminum until the metal on the side walls has been converted to non-conductive, aluminum oxide. The length of time this step takes is a function of the thickness of the layer as well as the strength of the current supplied. The structure produced after this step is illustrated in FIG. 6.

After the soft anodizing step, the alumimum oxide film 38 is dissolved. A suitable etchant is chosen which does not attack either the remaining aluminum layer 36 or the SiO$_2$ layer 22. The result of this dissolving step is to isolate the aluminum 36a in the base of the cavity 30 from the aluminum 36B remaining on the upper surface of the silicon dioxide layer 22 as illustrated in FIG. 7. The upper surface of the aluminum portions 36B, on the top surface of the silicon dioxide layer 22, may then be hard anodized. Hard anodizing forms a non-porous or barrier alumina layer, as compared with the porous layer formed in the soft anodizing step. The hard anodizing step is carried out electrochemically wherein a bus is connected only to the aluminum portions 36B, located on the top surface of the silicon dioxide layer 22. Since the aluminum 36A disposed at the base of the cavity 30 is electrically isolated from the remaining aluminum 36B, only the latter portions will be anodized into alumina 40, as illustrated in FIG. 8.

Using a suitable metal etchant, such as a phosphoric acid based etchant, the aluminum 36A, remaining in the cavity 30 is removed, as illustrated in FIG. 9. The hard anodized aluminua layer 40 masks the aluminum 36B underneath. The etchant is chosen such that it will not attack the silicon dioxide layer 22.

Cavity 30 may then be filled with the desired magnetic metallic material. Preferably, the magnetic material is formed from a nickel-iron or permalloy compound. The permalloy layer 42 can be formed utilizing well known sputtering techniques. As illustrated in FIG. 10, the cavity 30 is filled while a relatively thin layer is defined adjacent the top edges 44 of the cavity. As can be appreciated, since the cavity 30 is defined with accurate, vertical side walls, the permalloy in the cavity will be formed with similar, complimentary vertical sidewalls.

In accordance with the method of the subject invention, the permalloy layer 42 is then removed in a manner to expose the aluminum layer 36B adjacent the top edges 44 of the cavity 30. Preferably, the removal of the permalloy is accomplished by a back sputtering or sputter etching technique. Thereafter, aluminum layer 36B may be dissolved to release the excess permalloy 42. In the latter step, the structure is emersed in a sodium hydroxide solution, which is capable of dissolving both aluminum and aluminum oxide. As can be appreciated, since the aluminum layers support the excess portions of the permalloy extending beyond the cavity, these portions of the permalloy are washed away in the solution. The sodium hydroxide solution will dissolve either aluminum or the aluminum oxide such that the aluminum oxide layer 40 may be removed during this step. In the alternative, the aluminum oxide layer 40 can be removed prior to the addition of the permalloy layer 42.

The removal of the aluminum layer, as well as the excess permalloy, functions to define a planarized structure as illustrated in FIG. 11. The planarized structure is uniquely suited for the production of thin film magnetic heads. More particularly, since the side walls 32 of the permalloy material 42 are provided with accurate vertical side walls, the reading and writing ability of a recording head produced therefrom is maximized. In addition, the upper surface of the permalloy 42 is coplanar with the upper surface of the silicon dioxide layer 22. By this arrangement, additional layers may be uniformly deposited on the upper planar surface of the structure such that discontinuities, prevalent in the prior art, are substantially reduced.

In summary, there is provided a new and improved method for producing metallic magnetic patterns on a substrate for use with thin film magnetic recording heads. In the subject method, a permalloy pattern 42 is formed on the substrate. A non-magnetic, non-metallic material 22 is filled in around the side edges of the permalloy such that the top surface of the structure defines a plane. By this arrangement, additional layers may be readily deposited on the structure, while a permalloy pattern is defined which satisfies the strict geometric tolerance requirements necessary for accurate read/write operations.

While the subject invention has been described with reference to a preferred embodiment, it is to be understood that various other changes and modifications can be made therein, by one skilled in the art, without varying from the scope and spirit of the subject invention as defined by the appended claims.

What is claimed is:

1. A method of fabricating a magnetic metallic pattern on a substrate adapted for use with thin film recording heads comprising the steps of:
   a. forming a continuous, non-conductive, non-magnetic layer of a first material on said substrate;
   b. forming a continuous layer of a second material on said first material layer, said second material being an anodizable metal selected to be insoluable in an etchant of said first material;
   c. forming a photoresist layer on said second material layer in a negative pattern with respect to the desired metallic pattern;
   d. removing the exposed areas of said second material to expose said first material;
   e. plasma etching the exposed areas of said first material to define a cavity having relatively vertical side walls;
   f. removing any remaining portions of said second material layer;
   g. depositing a layer of said second material on said first material layer such that the thickness of said second material on the vertical side walls of said cavity is less than the thickness of the remainder of said second material layer;
   h. soft anodizing said second material layer to a depth sufficient to anodize the portions of said second material formed on said vertical side walls;
   i. dissolving the soft anodized portions of said second material such that the portions of said second layer formed on said side walls of said cavity are fully removed thereby electrically isolating the portions of said second material at the bottom of said cavity from the remaining portions of said second material located on the top of said first material;
   j. hard anodizing the exposed surface of said portions of said second material located on the top of said first material;
   k. removing the portion of said second material remaining in the bottom of said cavity;
   l. forming a continuous layer of said magnetic metallic material by sputtering such that said cavity is filled, and a relatively thin layer of said metallic material is defined adjacent the top edges of said cavity;
   m. removing the upper surface of said magnetic metallic material to a depth sufficient to expose said second material adjacent the top edges of the cavity; and
   n. dissolving said second material such that said magnetic metallic material deposited directly thereon is released from said first material whereby a metallic pattern having vertical side walls is formed in said cavity, with the top surface thereof being co-planar with the top surface of the remaining first material.

2. The method of claim 1 wherein said first material is selected from the group consisting of $SiO_2$, $Si_3N_4$ and $Al_2O_3$.

3. The method of claim 1 wherein said second material is a metal selected from the group consisting of aluminum and chromium.

4. The method of claim 1 wherein said first material is $SiO_2$, said second material is aluminum and said metallic pattern is formed from Ni-Fe.

5. The method of claim 1 wherein said the deposition of said second material, in step g, is carried out via electron beam vaporization.

6. The method of claim 1 wherein said soft anodizing step is accomplished by electrically connecting said second material in said cavity to a circuit and continuing said soft anodizing until the portions of said second material on said vertical side walls are fully anodized thereby breaking the electric circuit.

7. The method of claim 1 wherein said hard anodizing step is accomplished electrochemically, wherein the portions of said second material on the top of said first material are connected to a circuit, with the portions of said second material remaining in said cavity being electrically isolated therefrom, whereby only said portions of said second material on the top of said first material and connected to the circuit are hard anodized thereby facilitating the subsequent removal of the portions of said second material remaining in the cavity.

* * * * *